United States Patent [19]

Matsuura et al.

[11] Patent Number: 5,327,351
[45] Date of Patent: Jul. 5, 1994

[54] NON-CONTACT DIGITIZING METHOD

[75] Inventors: Hitoshi Matsuura, Hachioji; Eiji Matsumoto, Yamanashi, both of Japan

[73] Assignee: Fanuc Ltd., Yamanashi, Japan

[21] Appl. No.: 920,319

[22] PCT Filed: Dec. 25, 1991

[86] PCT No.: PCT/JP91/01764

§ 371 Date: Aug. 19, 1992

§ 102(e) Date: Aug. 19, 1992

[87] PCT Pub. No.: WO92/11974

PCT Pub. Date: Jul. 23, 1992

[30] Foreign Application Priority Data

Jan. 14, 1991 [JP] Japan ................... 3-14672

[51] Int. Cl.$^5$ .............................. G06F 15/46
[52] U.S. Cl. .............. 364/474.05; 364/474.03; 318/570; 318/577; 318/574
[58] Field of Search .............. 364/474.03, 474.04, 364/474.05, 474.2, 474.29; 318/474.29, 570, 577, 578, 579

[56] References Cited

U.S. PATENT DOCUMENTS

| | | | |
|---|---|---|---|
| 4,396,832 | 8/1983 | Henderson | 364/474.03 |
| 4,958,293 | 9/1990 | Tanaka et al. | 364/474.2 |
| 4,999,555 | 3/1991 | Yamazaki et al. | 364/474.03 |
| 5,019,993 | 5/1991 | Montalcini et al. | 364/474.03 |
| 5,140,239 | 8/1992 | Matsuura | 364/474.03 |
| 5,182,714 | 1/1993 | Matsuura | 364/474.03 |

FOREIGN PATENT DOCUMENTS

| | | |
|---|---|---|
| 61-274852 | 5/1986 | Japan . |
| 1-10237 | 11/1989 | Japan . |
| 33760 | 1/1991 | Japan . |
| 360956 | 3/1991 | Japan . |
| 3121754 | 5/1991 | Japan . |

Primary Examiner—Jerry Smith
Assistant Examiner—Brian C. Oakes
Attorney, Agent, or Firm—Staas & Halsey

[57] ABSTRACT

When a non-contact tracing of a configuration of a three-dimensional model is carried out, the measurement axis of a tracer head is controlled to always be facing in an optimum direction with respect to a model surface by controlling the attitude of the tracer head, to thereby create tracing data of the configuration of the model. The tracer head is provided with two non-contact distance sensing units, and a normal vector of the model surface is determined based on a measurement value obtained by sampling tracing data supplied from the tracer head. At this time, the direction of a normal vector is determined from the outer product of surface vectors in a range in which the angle between an axial vector starting from a measurement point of the measurement axis of the tracer head and the normal vector at the measurement point does not exceed 90°. The tracer head is controlled to be rotated in the direction toward a projection obtained by projecting the normal vector on a predetermined plane.

3 Claims, 5 Drawing Sheets

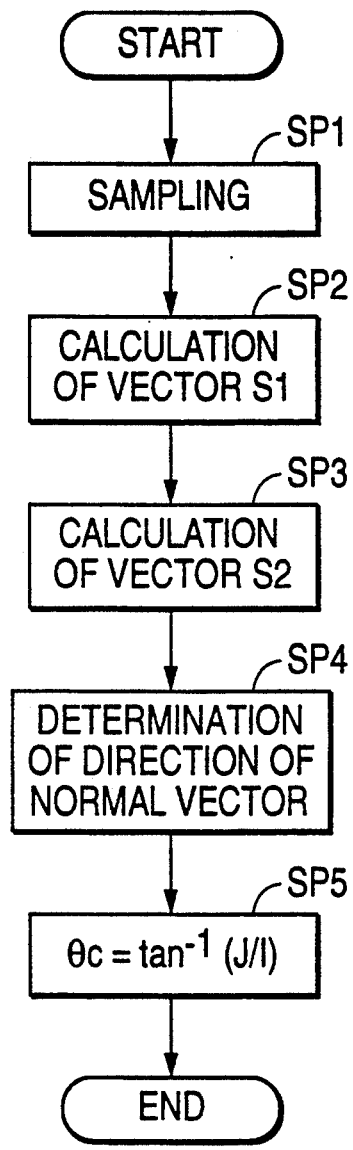

NON-CONTACT DIGITIZING METHOD

BACKGROUND OF THE INVENTION

1. Field of the Invention

The present invention relates to a non-contact digitizing method, and more specifically, to a non-contact digitizing method for creating a tracing data of a configuration of a three-dimensional model by controlling the attitude of a tracer head and tracing the configuration of the model while not in contact therewith,

2. Description of the Related Art

Recently, a non-contact trace control apparatus has been developed to trace a configuration of a model by using a non-contact distance sensing unit, An optical distance sensing unit is used as this non-contact distance sensing unit and is fixed to the extreme end of a tracer head, and a tracing is carried out by sensing a distance to a surface of a model, This tracing method eliminates any possibility of damage to a model, and accordingly, can be applied to a model composed of a soft material, and thus the applications for which a trace machining can be utilized are expected to increase, In general, a function for tracing a configuration of a model, sensing data of the Locus of the traced configuration at all times, and automatically outputting the data to an NC tape or the like is referred to as a digitizing method, A non-contact digitizing method enables digitizing data to be calculated without damage to a model surface.

In this connection, when a portion of a model having a large angle of inclination is traced by a conventional non-contact trace control apparatus, a problem arises in that a tracing accuracy of this portion is poor, and thus digitizing data having a pinpoint accuracy cannot be obtained. For example, when a surface of a model almost perpendicular to the surface on which the model is installed is traced, and the measurement axis of a tracer head is almost parallel with the surface of the model, a circular spot on the surface of the model is enlarged and distorted to become an ova I shape and thus the distance sensing resolution is Lowered. Therefore, to perform a non-contact digitizing with a high accuracy, a configuration of a model must be traced by using a tracer head able to be inclined in a direction optimum to a model surface, instead of a tracer head fixed in the direction (Z-axis direction) perpendicular to a plane on which the model is installed.

To solve the above problem, the inventors have U.S. Pat. No. 5,140,230, wherein a tracer head is provided with two non-contact distance sensing units, a normal vector on a model surface is determined based on a measured value obtained by sampling tracing data from the tracer head, and the tracer head is controlled in the direction of a projection obtained by projecting the normal vector onto a predetermined plane.

The invention disclosed in the preceding patent application relates to a non-contact trace control apparatus whereby three points are selected from a plurality of measured points, two surface vectors are determined from these three points, and the outer product of these surface vectors is calculated to determine the normal vector. Since, however, an order in which the surface vectors are multiplied is not fixed, a problem arises in that, when the order is reversed, two normal vectors facing in completely opposite directions are determined.

At this time, when a normal vector N having a positive value NZ of a Z-axis component is selected, this problem usually can be solved. Nevertheless, a normal vector N having a negative value NZ may be selected as a correct normal vector, particularly when a configuration of a model having a vertical or almost vertical surface is traced, due to a measurement error caused by a non-contact distance sensing mechanism or a calculation error caused by a calculating mechanism. Consequently, a normal vector that is unsuitable as a normal vector of a model surface is selected in the above non-contact trace control apparatus, the measurement axis of the tracer head is rotated by 180°, and thus a problem arises in that the tracer head cannot perform the required measurement or interferes with the model surface.

SUMMARY OF THE INVENTION

Taking the above into consideration, an object of the present invention is to provide a non-contact digitizing method by which a tracer head is controlled to rotate in an optimum direction with respect to a model surface at all times.

To attain the above object, according to the present invention, there is provided a non-contact digitizing method for creating tracing data of a configuration of a three-dimensional model while carrying out a non-contact tracing the configuration of the model. The method comprises the steps of determining at least two surface vectors based on three measured distances, by measuring distances to a plurality of measurement points on the surface of the model from a tracer head by using a tracer head having an inclined measurement axis in which the rotation thereof is controlled, determining the direction of a normal vector from the outer product of the surface vectors in a range in which the angle between an axial vector starting from the measurement point of the measurement axis of the tracer head and the normal vector at the measurement point does not exceed 90°, and sequentially creating the tracing data by controlling the rotation of the measurement axis of the tracer head based upon a projection obtained by projecting the normal vector on a plane on which the model is installed.

The Z-axis direction component (NZ) of a normal vector on the model is usually assumed to be $NZ > 0$. This is because a configuration of a model to which a noncontrol digitizing is applied has no overhung portion and a tracing is not carried out in a region where NZ is negative.

According to the present invention, when a normal vector is calculated, the direction of the normal vector is determined to be within the range in which the angle between the axial vector of the measurement axis and the normal vector does not exceed 90°. Consequently, a normal vector having a Z-axis direction component (NZ) in which $NZ \geq 0$ is selected. As a result, when a configuration of a model having a vertical or almost vertical surface is traced, a correct normal vector can be selected even if a measurement error i s caused by a non-contact distance sensing mechanism or a calculation error is caused by a calculation mechanism. Namely, the rotation of the measurement axis of the tracer head can be always controlled in an optimum direction with respect to a model surface.

BRIEF DESCRIPTION OF THE DRAWINGS

FIG. 6 is a flowchart for calculating a rotation angle.

DETAILED DESCRIPTION OF THE PREFERRED EMBODIMENTS

Figure 1:
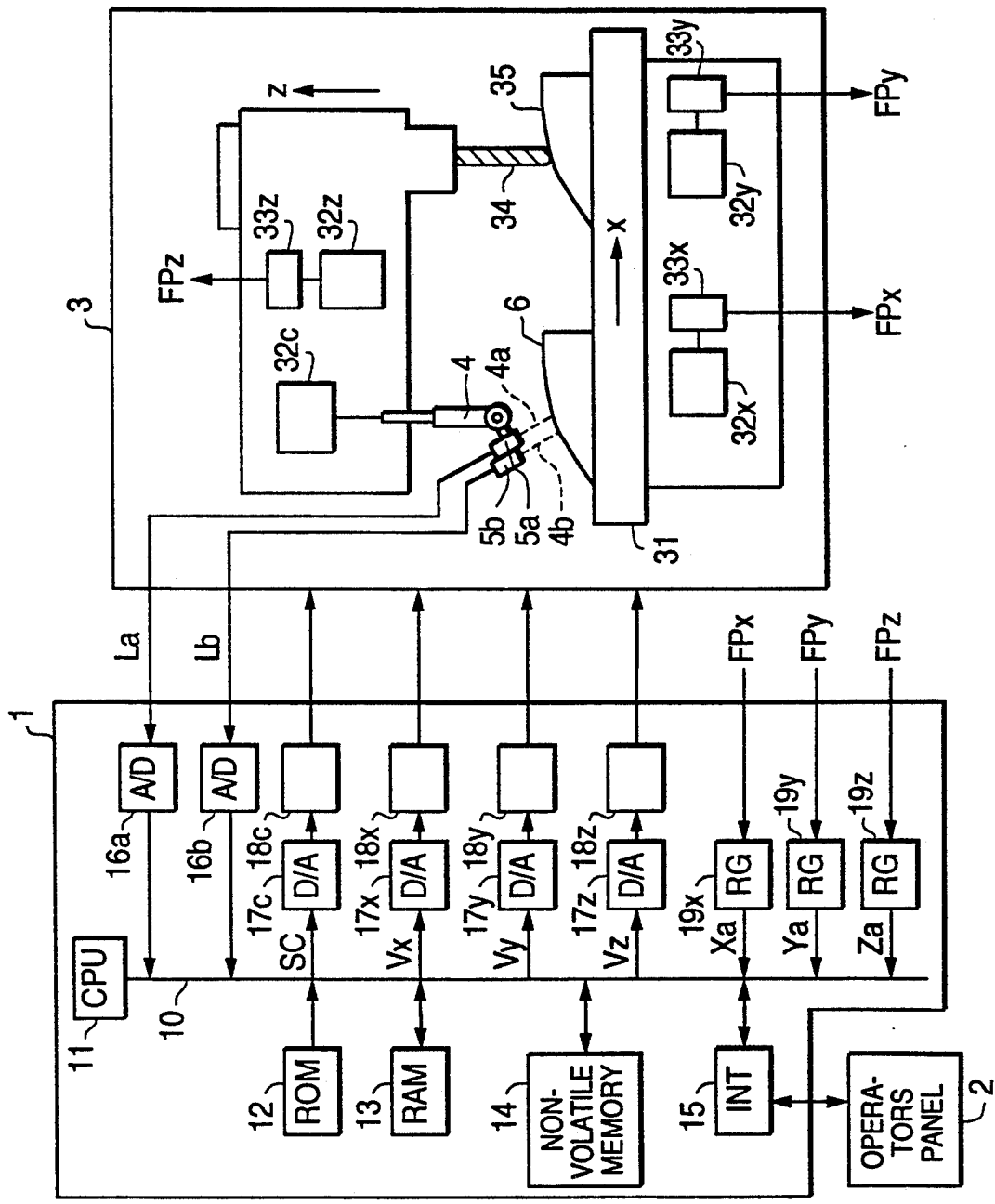
FIG. 1 is a block diagram showing an arrangement of a non-contact digitizing control apparatus.

An embodiment of the present invention will be described below with reference to the drawings. FIG. 1 is a block diagram showing an arrangement of a non-contact digitizing control apparatus and peripheral units.

A processor 11 of the digitizing control apparatus 1 reads a system program stored in a ROM 12 through a bus 10, and controls the operation of the digitizing control apparatus 1 as a whole in accordance with this system program. A RAM 13 for temporarily storing data stores measurement data from a non-contact distance sensing mechanism of a tracing machine tool, described later, and other temporary data. A non-volatile memory 14 is supplied with power from a not-shown battery and stores various parameters and the like, such as tracing directions, tracing speeds and the like, input from an operator's panel 2 through an interface 15.

Distance sensing units 5a and 5b are provided with the tracer head 4 of the tracing machine tool 3. A semiconductor laser, reflected light amount type distance sensing unit or the like using a light emitting diode as a light source, is used for the distance sensing units 5a and 5b. Here, measurement values La and Lb of distances to a model surface along measurement axes 4a, 4b are converted to digital values by A/D converters 16a and 16b in the digitizing control apparatus 1 and sequentially read by the processor 11.

The processor 11 calculates displacement amounts of the respective axes based on the A/D converted digital values and signals from present position registers 19x, 19y and 19z, described later, and generates speed commands Vx, Vy and Vz for the respective axes by a known art based on these displacement amounts and a commanded tracing direction and tracing speed. These speed commands are converted to analog values by D/A converters 17x, 17y and 17z and input to servo amplifiers 18x, and 18z, and the servo amplifiers 18x and 18y drive the servo motors 32x and 32y of the tracing machine tool 3 based on these speed commands, whereby a table 31 is moved in an X-axis direction and a Y-direction perpendicular to the surface of the paper. Further, the servo amplifier 18z drives a servo motor 32z to move the tracer head 4 and a tool 34 in a Z-axis direction.

The servo motors 32x, 32y and 32z are provided with pulse coders 33x, 33y and 33z that generate sensing pulses FPx, FPy and FPz each time these servo motors 32x, 32y and 32z are rotated by a predetermined amount. The present position registers 19x, 19y and 19z in the digitizing control apparatus 1 count up and down the sensing pulses FPx, FPy and FPz, respectively, in accordance with a rotational direction, determine present position data Xa, Ya and Za in the respective axis directions, and input same to the processor as control data.

Further, the processor 11 samples the measurement values La and Lb of the distance sensing units 5a and 5b at a predetermined sampling time, and at the same time, controls the above respective axes and determines a normal vector on the model surface by a calculation method, described below, by using the sampling values. A rotation command SC is created in correspondence with the projection vector obtained by projecting the normal vector onto an X-Y plane, and is converted to an analog value by a D/A con verter 17c. A servo amplifier 18c drives a servo motor 32c based on the rotation command SC and controls the tracer head 4 while inclining the measurement axis 4a of the tracer head 4 about the Z-axis by a predetermined angle. At the same time, the table 31 is moved in the commanded tracing direction at the commanded tracing speed, and thus a workpiece 35 is machined to the same configuration as that of the model 6 by the tool 34 having a Z-axis which is controlled in the same way as the tracer head 4.

Note, when the surface of the model 6 is almost vertical, the Z-axis direction component value NZ of a proper normal vector may be negative due to a measurement error caused by the distance sensing units 5a and 5b and a calculation error caused by the processor 11. In this case, unless a rotation command SC is created by selecting the projection vector obtained by projecting the normal vector onto the X - Y plane, even if the above NZ value is negative, by changing a calculation method of determining the direction of the normal vector, the attitude of the tracer head 4 is rotated in a reverse direction to that required by an operator.

To solve this problem, i.e., that the attitude of the tracer head 4 subject to the above rotation control is not stabilized, the present invention determines the direction of a normal vector in such a manner that the processor calculates the outer product of surface vectors to be in a range such that an angle between an axial vector starting from a measurement point of the measurement axis 4a of the tracer head 4 on the surface of the model 6 and a normal vector at this measurement point does not exceed 90°.

Figure 2:
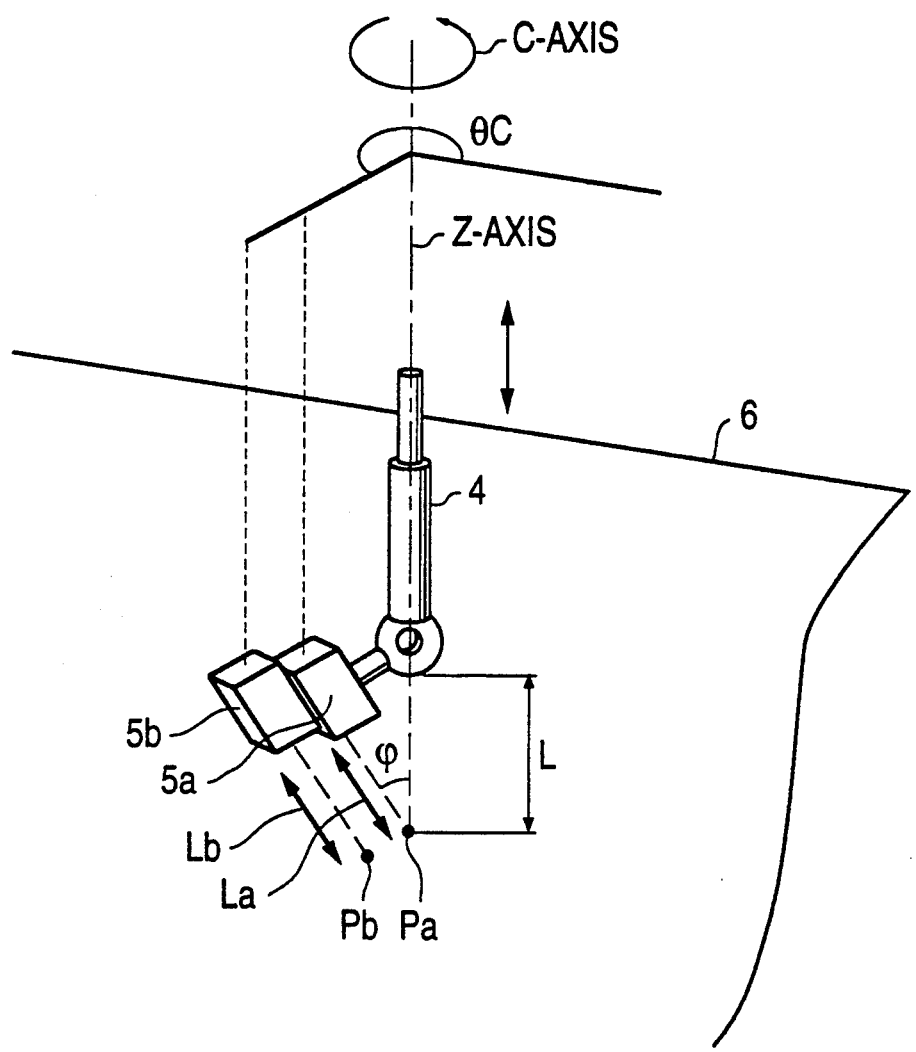
FIG. 2 is a diagram showing a tracer head in detail.

FIG. 2 is a detailed diagram of the tracer head 4, wherein the distance sensing unit 5a is mounted to the tracer head 4 at an inclined angle $\phi$ with respect to the Z-axis, and the measurement axis 4a is rotated by a C-axis by a command angle $\theta c$ of the rotation command SC. Further, the distance sensing unit 5b is mounted on the outside of the distance sensing unit 5a and is controlled to rotate by the commanded angle 8c in the same way as the distance sensing unit 5a.

With this arrangement, the measurement axis 4a of the distance sensing unit 5a is controlled to rotate in an optimum direction with respect to an inclined angle of the surface of the model 6, i.e., to a position nearest to the normal of the model 6.

Further, as described above, a distance La from the distance sensing unit 5a to a measurement point Pa on the model 6 is kept constant by a value measured by the distance sensing unit 5a and fed back to the digitizing control apparatus 1. The distance La is set to the distance between the measurement axis of the distance sensing unit 5a and the point at which the measurement axis intersects the Z-axis, and the measurement point Pa is not moved even if the tracer head 4 is rotated by the C-axis, and thus a distance L between the tracer head 4 and the model 6 is kept constant. In the same way, the distance measurement unit 5b measures a distance Lb to a measurement point Pb on the model 6 therefrom and inputs same to the digitizing control unit 1.

Figure 3:
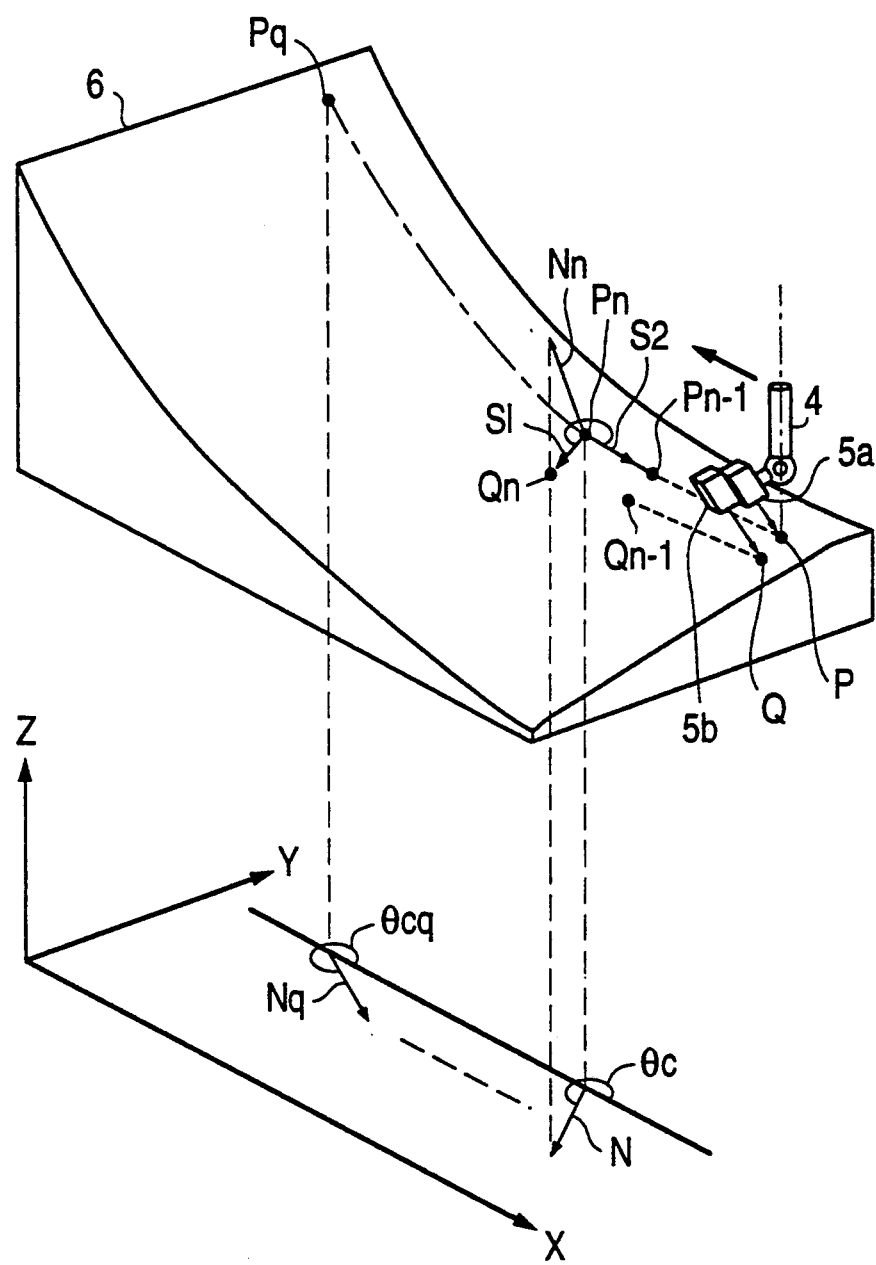
FIG. 3 is a diagram explaining the control of the rotation of a tracer head.

Next, a method of calculating a rotational angle of the tracer head 4 will be described with reference to FIG. 3.

A tracing operation is carried out by moving the tracer head 4 in the X-axis direction, with respect to the model 6, at a predetermined tracing speed, and at the same time, measurement data of two points Pn and Qn is sampled at predetermined intervals. Coordinate values of the points Pn−1, Qn−1, Pn, On, Pn+1, Qn+1, ... on the model 6 are determined based on these measured values and present positional data output from the present position register.

A surface vector S1 [X2−X1, Y2−Y1, Z2−Z1] is determined from, for example, the coordinate values (X1, Y1, Z1) of the point Pn and the coordinate values (X2, Y2, Z2) of the point On. Further, a surface vector S2 [X3—X1, Y3—Y1, Z3—Z1] is determined from the coordinate values (X3, Y3, Z3) of the point Pn−1 and the coordinate values (X1, Y1, Z1) of the point Pn. In this case, measurement data obtained by a preceding sampling is stored in the RAM 13 or the like as the coordinate values of the point Pn−1. An outer product of these two surface vectors S1 and S2 is calculated by the following formula, whereby normal vector Nn at the point Pn can be determined.

$$Nn = S1 \times S2$$

(where, Nn, S1 and S2 represent vectors.)

Here, the Z-axis direction component (NZ) of the normal vector Nn on the model 6 is usually assumed to be $NZ \geq 0$. This is because that a configuration of a model to which a non-contact digitizing is applied has no overhung portion and a tracing is not carried out in a region where NZ is negative.

Next, an angle $\theta c$ between a projection vector N obtained by projecting the normal vector Nn onto the X—Y plane and the X-axis is determined by the following formula and output as a command value to a C-axis.

$$\theta c = \tan^{-1}(jn/In)$$

where,
In: X component of the vector Nn
Jn: Y component of the vector

This angle $\theta c$ is changed in correspondence with an inclination of the model 6 and becomes another angle $\theta cq$ at, for example, a point Pq. The tracer head 4 is rotated in accordance with the change of these angles $\theta c$, $\theta cq$.

Figure 4:
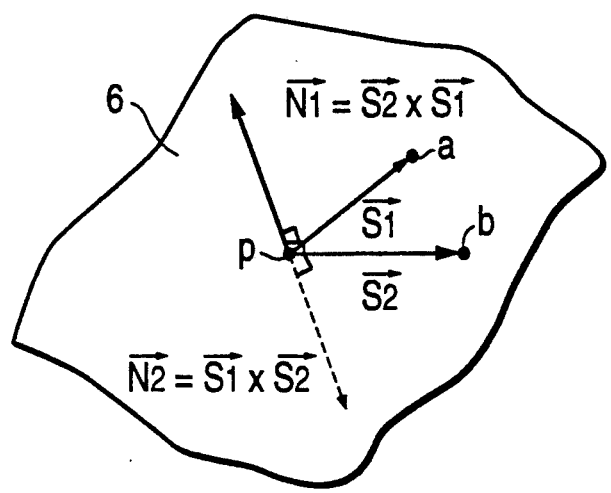
FIG. 4 is a diagram showing two normal vectors facing in opposite directions at a measurement point.

FIG. 4 shows two normal vectors facing in exactly opposite directions at a measurement point. The two surface vectors S1 and S2 are determined from measurement points p, a and b, and normal vectors N1 and N2 are calculated by calculating the outer product of these surface vectors S1 and S2. More specifically, if an order of multiplying the surface vectors S1 and S2 is not fixed in the calculation of the normal vector, the two normal vectors N1 and N2 facing in exactly opposite directions will be determined when the order for multiplying same is reversed.

Consequently, if the vector N2 in FIG. 4, which is not suitable as the normal vector on the model surface, is selected, the tracer head 4 does not properly correspond to the inclination of the model 6 when rotated.

Figure 5:
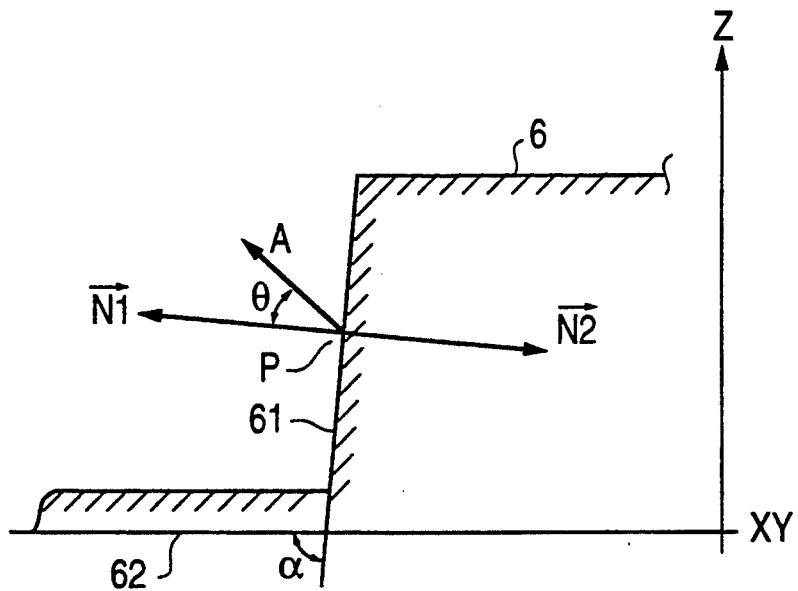
FIG. 5 is a diagram explaining a case in which a normal vector has a negative Z-axis direction component NZ.

FIG. 5 is a diagram explaining a case in which the Z-axis direction component value NZ of a normal vector is made negative at the measurement point p, because the surface of the model 6 is almost vertical, Here, only the case in which the vertical surface 61 of the model 6 is not overhung is assumed, and thus an angle $\alpha (\leq 90°)$ exists between a surface 62 on which the model is installed and the vertical surface 61. Therefore, it is not necessary to assume the axial vector of the measurement axis of the tracer head, i.e., unit axis vector A starting from the measurement point p to which a measurement light is irradiated, and a vector to be determined by the calculation of an outer product is the normal vector N of the two normal vectors N and N2. The Z-axis direction component N of the normal vector N is usually $NZ1 \geq 0$.

Even if an order for multiplying surface vectors is reversed in the calculation of a normal vector, a normal vector facing in a correct direction can be selected by selecting a normal vector having a Z-axis direction component NZ of $NZ \geq 0$, and thus the rotation of the measurement axis of the tracer head can be controlled in an optimum direction with respect to a model surface.

Nevertheless, when a configuration of the model having the vertical surface 61 or a surface near to the vertical is traced as described above, the Z-axis direction component (NZ1) of the normal vector N1 may be determined as a negative value and the Z-axis direction component (NZ2) of the other normal vector N2 may be determined as a positive value. According to the non-contact digitizing method of the present invention, one of the two normal vectors N1 and N2 is selected, depending upon whether or not the respective axial components (AX, AY, AZ) and (NX, NY, NZ) of a unit axis vector A starting from the measurement point p to which a measurement light is irradiated and a unit normal vector N satisfy the following formula.

$$AX \times NX + AY \times NY + AZ \times NZ \geq 0$$

The left side portion of the above formula is equal to the cosine of the angle $\theta$ between the unit axis vector A and the unit normal vector N from the principle of an inner product. Therefore, when this formula is not established, a value of $\cos\theta$ is negative, which means that the angle $\theta$ is larger than 90°.

More specifically, as apparent from FIG. 5, when the normal vector N2 having the angle $\theta$ larger than 90° is selected, a rotational direction of the tracer head 4 is determined such that the tracer head 4 tries to determine a measurement point from the backside of the vertical surface 61 of the model 6, and when the rotation of the tracer head 4 is controlled in this state, the measurement axis of the tracer head 4 is rotated by 180°, and thus the tracer head 4 cannot carry out the measurement or may interfere with the model surface.

FIG. 6 is a flowchart used to calculate a rotational angle, wherein numerals prefixed with an "SP" indicate the numbers of steps of the process.

[SP1] Values measured by the distance sensing units 5a and 5b are sampled at predetermined intervals.

[SP2] The vector S1 is determined from the values measured by the respective distance sensing units this time.

[SP3] The vector S2 is determined from the value measured by the distance sensing unit 5a this time and the value measured last time.

[SP4] The outer product of the vectors S1 and S2 is calculated and the direction of the normal vector N is determined to be in the range in which the angle between the axial vector starting from the measurement point and the normal vector at the measurement point does not exceed 90°.

[SP5] The angle θc between a projection obtained when the thus determined normal vector N is projected onto the X - Y plane and the X-axis, is calculated.

Note, in the above embodiment, the normal vector is determined based on one of the data measured the last sampling time and the data measured this sampling time, with respect to the two sensing points, If, however, the three points on the model surface obtained by the samplings this time and last time are specified, two surface vectors using one of these points as a start point can be determined.

Further, a triangulation type, eddy current type or ultrasonic type distance sensing unit may be used as the distance sensing unit, in addition to the reflected light amount type distance sensing unit.

The present invention can be of course applied to a digitizing control apparatus which does not have a tracing function for simultaneously machining a model but has only a function for automatically outputting data obtained from a model configuration to an NC tape and the like.

As described above, according to the present invention, since a proper normal vector can be selected even if a measurement error is caused by a non-contact distance sensing mechanism or a calculation error is caused by a calculation mechanism when a vertical or almost vertical model surface is traced, the rotation of the measurement axis of the tracer head can be always controlled in an optimum direction with respect to the model surface.

With this arrangement, since the tracer head is stably controlled to cause the measurement axis of a distance measurement means to face in a direction as perpendicular as possible to a model surface, to thus prevent a lowering of the measurement accuracy of the distance measurement means, a distance can be measured with a pinpoint accuracy to thereby improve the tracing accuracy.

Consequently, according to the digitizing control apparatus of the present invention, tracing data can be effectively obtained at a high speed and Low cost by making use of a spot system by which a distance is sensed by irradiating a spot light to a model.

We claim:

1. A non-contact digitizing method for creating tracing data of a configuration of a three-dimensional model while carrying gout a non-contact tracing of the configuration of the model, comprising the steps of:

measuring a plurality of distances from a tracer head to a plurality of measurement points on a surface of said model, said tracer head having an inclined measurement axis for controlling a rotation of said tracer head;

determining at least two surface vectors based on three of said plurality of measured distances;

determining a direction of a normal vector to said surface vectors based on a product of said surface vectors and also based on an angle between an axial vector, starting from one of said measurement points of said inclined measurement axis of said tracer head, and said normal vector at said one measurement point which said angle does not exceed 90°; and sequentially creating said tracing data by controlling the rotation of the measurement axis of said tracer head based upon a projection obtained by projecting said normal vector in said determined direction on a plane on which said model is installed.

2. A non-contact digitizing method according to claim 1, wherein each step of determining said surface vectors comprises the steps of determining coordinate values of three different points on said model surface based on said three measured distances, and determining first and second plane vectors directed from one point of said three coordinate values to the other two points thereof.

3. A non-contact digitizing method according to claim 1, wherein said step of determining the direction of said normal vector includes the steps of determining whether the respective axial components (AX, AY, AZ) of said axial vector being a unit axial vector and respective normal vector components (NX, NY, NZ) of said normal vector being a unit normal vector satisfy the following formula $$AX \times NX + AY \times NY + AZ \times NZ \geq 0.$$

* * * * *

UNITED STATES PATENT AND TRADEMARK OFFICE
CERTIFICATE OF CORRECTION

PATENT NO. : 5,327,351
DATED : JULY 5, 1994
INVENTOR(S) : HITOSHI MATSUURA ET AL.

It is certified that error appears in the above-indentified patent and that said Letters Patent is hereby corrected as shown below:

Col. 1, line 15, "unit," should be --unit.--;
line 19, "model," should be --model.--;
line 23, "increase," should be --increase.--;
line 25, "Locus" should be --locus--;
line 28, "method," should be --method.--;
line 41, "ova l" should be --oval--;
line 42, "Lowered." should be --lowered.--.

Col. 2, line 50, "noncontrol" should be --non-contact--;
line 63, "i s" should be --is--.

Col. 3, line 45, "AID" should be --A/D--;
line 53, "18x, and 18z," should be --18x, 18y, and 18z,--.

Col. 4, line 2, "processor as" should be --processor 11 as--;
line 12, "i s" should be --is--;
line 13, "con verter" should be --converter--;
line 40, "cessor calculates" should be --cessor 11 calculates--;
line 53, "8c" should be --$\theta c$--.

UNITED STATES PATENT AND TRADEMARK OFFICE
CERTIFICATE OF CORRECTION

PATENT NO. : 5,327,351  Page 2 of 3
DATED : JULY 5, 1994
INVENTOR(S) : HITOSHI MATSUURA ET AL.

It is certified that error appears in the above-indentified patent and that said Letters Patent is hereby corrected as shown below:

Col. 5,  line 14, "On," should be --Qn,--;
line 21, "On." should be --Qn.--;
line 29, "whereby normal" should be --whereby a normal--;
line 50, "vector" should be --vector Nn--.

Col. 6,  line 6, "vertical," should be --vertical.--;
line 8, "i s" should be --is--;
line 16, "N" (first occurrence) should be --N1--; and
line 16, "N and N2." should be --N1 and N2.--;
line 17, "N" should be --NZ1--;
line 18, "N" should be --N1--.

Col. 7,  line 10, "[SPS]" should be --[SP5]--;
line 16, "points," should be --points.--.

UNITED STATES PATENT AND TRADEMARK OFFICE
CERTIFICATE OF CORRECTION

PATENT NO. : 5,327,351
DATED : JULY 5, 1994
INVENTOR(S) : HITOSHI MATSUURA ET AL.

It is certified that error appears in the above-indentified patent and that said Letters Patent is hereby corrected as shown below:

Col. 8,     line 1, "Low" should be --low--;
               line 7, "gout" should be --out--;
               line 30, "each" should be --said--;
               line 40, "steps" should be --step--.

Signed and Sealed this

First Day of November, 1994

Attest:

BRUCE LEHMAN

Attesting Officer      Commissioner of Patents and Trademarks